(12) United States Patent
Finke

(10) Patent No.: US 10,443,318 B2
(45) Date of Patent: Oct. 15, 2019

(54) THREADED CONNECTION WITH HIGH BEND AND TORQUE CAPACITIES

(71) Applicant: Halliburton Energy Services, Inc., Houston, TX (US)

(72) Inventor: Michael Dewayne Finke, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 574 days.

(21) Appl. No.: 15/038,787

(22) PCT Filed: Dec. 27, 2013

(86) PCT No.: PCT/US2013/077942
§ 371 (c)(1),
(2) Date: May 24, 2016

(87) PCT Pub. No.: WO2015/099757
PCT Pub. Date: Jul. 2, 2015

(65) Prior Publication Data
US 2016/0376850 A1 Dec. 29, 2016

(51) Int. Cl.
*F16L 15/00* (2006.01)
*E21B 17/042* (2006.01)

(52) U.S. Cl.
CPC .......... *E21B 17/042* (2013.01); *F16L 15/001* (2013.01)

(58) Field of Classification Search
CPC ....... E21B 17/042; F16L 15/001; F16L 15/00; F16L 15/003

(Continued)

(56) References Cited

U.S. PATENT DOCUMENTS 1,715,547 A * 6/1929 Hardesty ............. E21B 17/1057
285/334
1,999,706 A * 4/1935 Spang ................... E21B 17/042
285/116

(Continued)

FOREIGN PATENT DOCUMENTS

CA 3010955 A1 * 11/2018 ........... E21B 17/042
CN 101010536 A 8/2007

(Continued)

OTHER PUBLICATIONS

"Ultimate Connection Series", NOV Brochure, 2012, 8 Pages.

(Continued)

*Primary Examiner* — David Bochna
(74) *Attorney, Agent, or Firm* — Alan Bryson; Baker Botts L.L.P.

(57) ABSTRACT

An example threaded connection includes first component and a second component. The first component may have a first outer diameter, a first threaded portion at or near the first outer diameter, and an end portion. The second component have may a second outer diameter a second outer diameter greater than the first outer diameter; a second threaded portion, at least one of the first or second sets of threads having at least one of a variable pitch and a variable taper; and an internal shoulder positioned to contact the end portion of the first component when the first threaded portion are engaged with the second threaded portion. A connection ring may be coupled to the second component and positioned to engage with a portion of the first component when the first component is positioned within the second component.

9 Claims, 4 Drawing Sheets

(58) Field of Classification Search
USPC .................................................. 285/333, 334
See application file for complete search history.

(56) References Cited

U.S. PATENT DOCUMENTS

| | | | | |
|---|---|---|---|---|
| 2,183,644 | A * | 12/1939 | Frame | E21B 17/042 285/333 |
| 2,992,021 | A * | 7/1961 | Nay | E21B 17/0426 285/334 |
| 3,079,181 | A | 2/1963 | Van der Wissel | |
| 3,150,889 | A * | 9/1964 | Watts | F16L 15/003 277/622 |
| 3,923,324 | A * | 12/1975 | Cruickshank | E21B 17/042 285/333 |
| 4,067,404 | A * | 1/1978 | Crase | F16L 11/18 175/75 |
| 4,113,290 | A * | 9/1978 | Miida | F16L 15/003 285/334 |
| 4,121,862 | A * | 10/1978 | Greer | F16L 15/001 285/333 |
| 4,332,502 | A | 6/1982 | Wormald et al. | |
| 4,346,920 | A * | 8/1982 | Dailey | F16L 15/001 285/334 |
| 4,444,421 | A * | 4/1984 | Ahlstone | F16L 15/001 285/334 |
| 4,549,754 | A | 10/1985 | Saunders et al. | |
| 4,595,219 | A * | 6/1986 | Lenze | E21B 17/042 285/332.2 |
| 4,625,814 | A | 12/1986 | Helasuo et al. | |
| 4,629,222 | A * | 12/1986 | Dearden | E21B 17/042 285/332.4 |
| 4,629,223 | A * | 12/1986 | Dearden | E21B 17/042 285/334 |
| 4,705,307 | A * | 11/1987 | Chelette | F16L 15/008 285/332.3 |
| 4,988,127 | A | 1/1991 | Cartensen | |
| 5,169,183 | A * | 12/1992 | Hallez | E21B 17/042 285/334 |
| H001329 | H * | 7/1994 | Bailey | E21B 17/042 285/333 |
| 5,562,672 | A | 10/1996 | Huebner et al. | |
| 5,971,443 | A * | 10/1999 | Noel | F16L 15/004 285/334 |
| 6,305,723 | B1 * | 10/2001 | Schutz | E21B 17/042 285/333 |
| 6,550,822 | B2 * | 4/2003 | Mannella | E21B 17/042 285/333 |
| 6,857,668 | B2 * | 2/2005 | Otten | F16L 15/003 285/332.3 |
| 7,452,007 | B2 * | 11/2008 | Hashem | E21B 43/103 285/334 |
| 2002/0113436 | A1 * | 8/2002 | Verdillon | F16L 15/004 285/333 |
| 2003/0038476 | A1 * | 2/2003 | Galle, Jr. | E21B 17/042 285/92 |
| 2003/0155769 | A1 * | 8/2003 | Haines | E21B 17/042 285/333 |
| 2004/0251686 | A1 * | 12/2004 | Otten | E21B 17/042 285/333 |
| 2005/0189147 | A1 | 9/2005 | Williamson et al. | |
| 2005/0257961 | A1 | 11/2005 | Snell et al. | |
| 2006/0145477 | A1 | 7/2006 | Reynolds | |
| 2006/0214421 | A1 * | 9/2006 | Muradov | E21B 17/042 285/333 |
| 2008/0303275 | A1 * | 12/2008 | Johnson | E21B 17/042 285/334 |
| 2010/0045033 | A1 * | 2/2010 | Watts | F16L 15/004 285/333 |
| 2011/0277986 | A1 | 11/2011 | Purkis | |

FOREIGN PATENT DOCUMENTS

| | | |
|---|---|---|
| CN | 101184903 A | 5/2008 |
| CN | 201301671 Y | 9/2009 |
| CN | 201460760 U | 5/2010 |
| CN | 101864906 A | 10/2010 |
| CN | 102191916 A | 9/2011 |
| CN | 202380987 U | 8/2012 |
| EP | 1277887 A2 | 1/2003 |

OTHER PUBLICATIONS

International Search Report and Written Opinion issued in related PCT Application No. PCT/US2013/077942 dated Sep. 26, 2014, 17 pages.
International Preliminary Report on Patentability issued in related Application No. PCT/US2013/077942, dated Jul. 7, 2016 (13 pages).
Office Action issued in related Chinese Application No. 201380080512. 7, dated Jan. 4, 2017 (20 pages).

* cited by examiner

THREADED CONNECTION WITH HIGH BEND AND TORQUE CAPACITIES

CROSS-REFERENCE TO RELATED APPLICATION

The present application is a U.S. National Stage Application of International Application No. PCT/US2013/077942 filed Dec. 27, 2013, which is incorporated herein by reference in its entirety for all purposes.

BACKGROUND

Hydrocarbons, such as oil and gas, are commonly obtained from subterranean formations that may be located onshore or offshore. In most cases, the formations are located thousands of feet below the surface, and a wellbore must intersect the formations before the hydrocarbon can be recovered. Drilling tools and equipment used to reach the formations typically include multiple segments that are coupled together using threads. These threaded connections may be subject to high torque and bending loads that the threaded connections must be able to handle without breaking or loosening.

FIGURES

Some specific exemplary embodiments of the disclosure may be understood by referring, in part, to the following description and the accompanying drawings.

Figure 1:
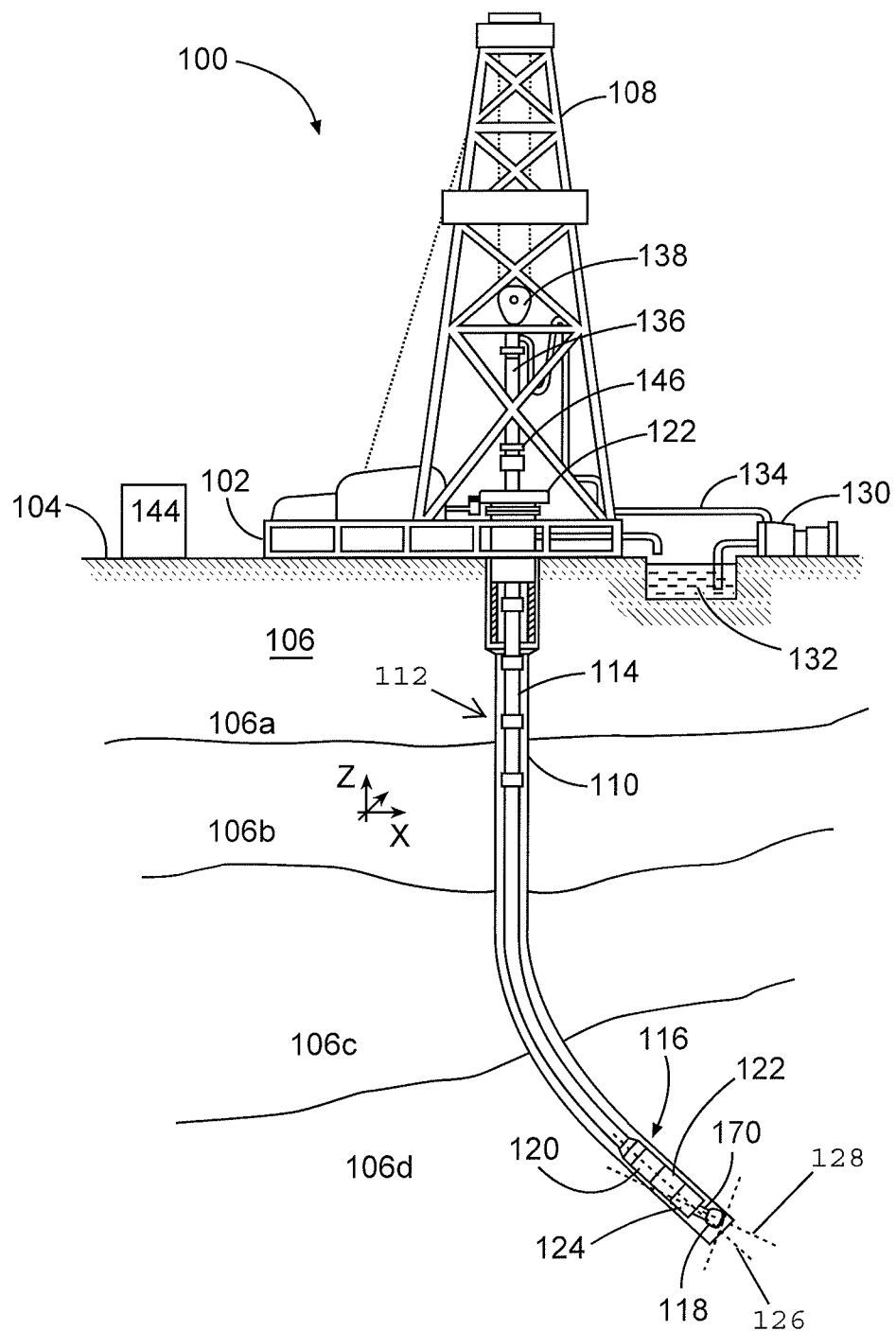
FIG. 1 is a diagram of an example drilling system, according to aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present disclosure are described in detail herein. In the interest of clarity, not all features of an actual implementation may be described in this specification. It will of course be appreciated that in the development of any such actual embodiment, numerous implementation-specific decisions are made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like.

The terms "couple" or "couples" as used herein are intended to mean either an indirect or a direct connection. Thus, if a first device couples to a second device, that connection may be through a direct connection or through an indirect mechanical connection via other devices and connections.

Modern petroleum drilling and production operations demand information relating to parameters and conditions downhole. Several methods exist for downhole information collection, including logging-while-drilling ("LWD") and measurement-while-drilling ("MWD"). In LWD, data is typically collected during the drilling process, thereby avoiding any need to remove the drilling assembly to insert a wireline logging tool. LWD consequently allows the driller to make accurate real-time modifications or corrections to optimize performance while minimizing down time. MWD is the term for measuring conditions downhole concerning the movement and location of the drilling assembly while the drilling continues. LWD concentrates more on formation parameter measurement. While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

The present disclosure is directed to a threaded connection with high bend and torque capacities. For the remainder of this disclosure, the threaded connection will be described with respect to downhole tools used in hydrocarbon recovery and drilling operations. Threaded connections incorporating aspects of the present disclosure are not limited to uses in hydrocarbon recovery and drilling operations, however. Rather, the threaded connections may be used in a variety of other applications that would be appreciated by one of ordinary skill in the art in view of this disclosure.

FIG. 1 is a diagram of an example steerable drilling system 100, according to aspects of the present disclosure. The drilling system 100 may comprise a drilling platform 102 positioned at the surface 104. In the embodiment shown, the surface 104 comprises the top of a formation 106 containing one or more rock strata or layers 106a-d. Although the surface 104 is shown as land in FIG. 1, the drilling platform 102 of some embodiments may be located at sea, in which case the surface 104 would be separated from the drilling platform 102 by a volume of water.

The drilling system 100 may include a rig 108 mounted on the drilling platform 102, positioned above borehole 110 within the formation 106, and having a traveling block 138 for raising and lowering a drilling assembly 112 partially positioned within the borehole 110. The drilling assembly 112 may comprise a drill string 114 with multiple drill pipe segments that are threadedly engaged. A kelly 136 may support the drill string 114 as it is lowered through a rotary table 142. A drill bit 118 may be coupled directly or indirectly to the drill string 114 via a threaded connection, and driven by a downhole motor and/or rotation of the drill string 114 by the rotary table 142. As bit 118 rotates, it extends the borehole 110. A pump 130 may circulate drilling fluid through a feed pipe 134 to kelly 136, downhole through the interior of drill string 114, through orifices in drill bit 118, back to the surface via the annulus around drill string 114, and into a retention pit 132. The drilling fluid transports cuttings from the borehole 110 into the pit 132 and aids in maintaining integrity or the borehole 16.

In certain embodiments, the drilling assembly 112 may further comprise a bottom-hole assembly (BHA) 116. The BHA 116 may be coupled to the drill string 114 through at least one threaded connection, as may the drill bit 118 to the BHA 116. The BHA 116 may include tools such as LWD/MWD elements 122, steering assembly 124, and telemetry system 120. The LWD/MWD elements 122 may comprise downhole instruments, including sensors, that may continuously or intermittently monitor downhole drilling parameters and downhole conditions. The telemetry system 120 may provide communication with a surface control unit 144 over various channels, including wired and wireless communications channels as well as mud pulses through a drilling mud within the borehole 110. In certain embodiments, each of the LWD/MWD elements 122, steering assembly 124, and telemetry system 120 may be coupled together via threaded connections. Additionally, smaller elements within each of the LWD/MWD elements 122, steering assembly 124, and telemetry system 120 may be coupled together via threaded connections.

In certain embodiments, the steering assembly 124 may comprise a bit sub 170 that is coupled to the drill bit 118 via a threaded connection and that transmits torque to the drill bit 118 for the purposes of extending the borehole 110 in the formation 106. In certain embodiments, the bit sub 170 also may be used by the steering assembly 124 to alter or maintain a drilling direction of the drilling system by altering or maintaining a longitudinal axis 128 of the drill bit 118. For example, the steering assembly 124 may impart lateral forces on the bit sub 170, which are transmitted then to the drill bit 118 to alter its longitudinal axis with respect to an axis 126 of the borehole 110. The bit sub 170 may also receive opposite lateral forces from the drill bit 118 when the drill bit 118 contacts the formation, which form a bending load on the bit sub 170. Thus, the bit sub 170 must withstand and transmit both torque and bending loads to the drill bit 118.

Figure 2:
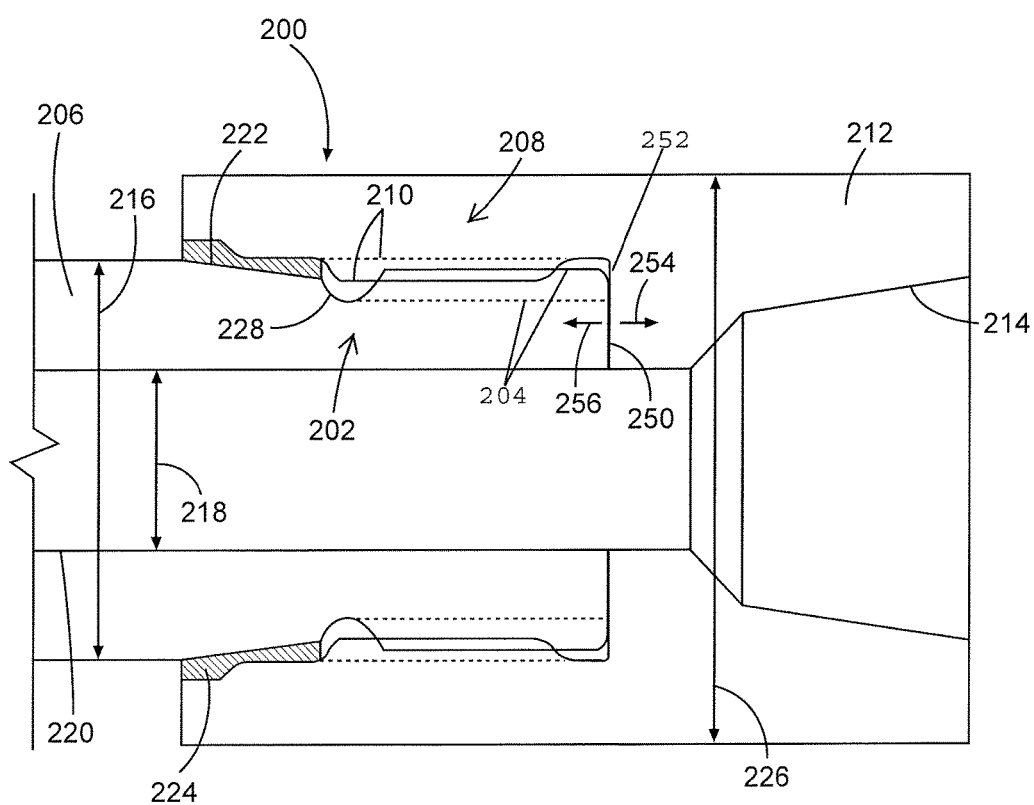
FIG. 2 is a diagram of an example threaded connection, according to aspects of the present disclosure.

According to aspects of the present disclosure, a threaded connection with high torque and bending limits may be used in at least one of the threaded connections between the elements of the drilling system 100 described above. FIG. 2 is a diagram illustrating an example threaded connection 200, according to aspects of the present disclosure. The threaded connection 200 will be described below with respect to a bit sub for a downhole steering assembly, but the threaded connection 200 is equally applicable to other downhole applications where high torque and bending loads are present. In the embodiment shown, the threaded connection 200 comprises a pin portion 202 with a threaded portion 204 on a cylindrical outer surface of a first component 206 of the threaded connection 200, and a box portion 208 with a threaded portion 210 on a cylindrical inner surface of a second component 212 of the threaded connection 200, the threaded portion 210 configured to threadedly engage with threaded portion 204. The second component 212 may comprise a bit sub with a tapered inner surface 214 through which a drill bit (not shown) may be threadedly engaged or otherwise coupled. The first component 206 may comprise a drive shaft or another component through which the second component 212 and a drill bit coupled to the second component may be coupled to a steering assembly (now shown).

The first component 206 may comprise a cylindrical tubular element characterized by an outer diameter 216 and an inner diameter 218. The inner diameter 218 may define a bore 220 through which drilling fluids may flow during drilling operations. The threads 204 may be positioned at the outer diameter 216 of the first component 206 and proximate to an end 250 of the first component 206. Positioning the threads 204 at the outer diameter 216 of the first component 206 may increase the surface area on the end 250 of the first component 206, which may increase the torque limit of the threaded connection 220, as will be described below. In the embodiment shown, the threads 204 are positioned on a portion of the first component 206 with an outer diameter that is negligibly smaller than diameter 216, following a slight taper 222 that may facilitate an interference fit with a connection ring 224 of the second component 212, as also will be described below. A first thread relief 228 may be positioned between the threads 204 and the taper 222. The degree of the taper 222 and the resulting smaller outer diameter at the threads 204 is exaggerated for illustrative purposes in FIG. 2 and may be negligible with respect to the outer diameter 216 of the first component 206.

The second component 212 also may comprise a cylindrical tubular component, characterized by an outer diameter 226 that is larger than the outer diameter 216 of the first component 206. The second component 206 may include one more internal surfaces that accommodate the pin portion 202 of the threaded connection 200 and the first component 206. For example, the threads 210 may be positioned on a substantially cylindrical inner portion of the second component 212 that aligns with the threads 204 and accommodates the outer diameter 216 and inner diameter 218 of the first component 206. The second component 212 further may comprise a second thread relief 230 between the threads 210 and an internal shoulder 252 of the second component 212.

As shown in FIG. 2, the threads 204 and 210 may engage in an area with a cross section that includes both the inner diameter 218 of the first component 206 and the outer diameter 226 of the second component 212. This cross sectional area may be referred to as the section modulus of the threaded connection 200, and the size of the section modulus may positively correlate with the strength of the threaded connection 200. With respect to threaded connection 200, because the section modulus includes both the inner diameter 218 of the first component 206 and the outer diameter 226 of the second component 212, and because the outer diameter 226 of the second component 212 is larger than the outer diameter 216 of the first section 202, the section modulus of the threaded connection 200 is larger and the torque and bending limit is higher than in a typical box and pin connection where the first and second sections have similar inner and outer diameters.

The internal shoulder 252 may be sized and positioned to contact the end 250 of the first component 206. The shoulder 252 may receive axial force 254 from the first component 206 when the threads 204 and 210 are fully engaged, as is shown in FIG. 2. The shoulder 252 may, in turn, impart an opposite axial force 256 on the first component 206. The magnitude of the axial forces 254 and 256 between the end 250 of the first component 206 and the shoulder 252 depends, in part, on the contact surface area between the end 250 of the first component 206 and the shoulder 252, and positively correlates with the torque limit of the threaded connection 202. With the threads 204 positioned at or near the outer diameter 216 of the first component 206, rather than on a significantly tapered portion or smaller diameter as is found in typical box-and-pin connections, the surface area of the end 250 of the first component 206 is increased, as is the torque limit of the threaded connection 200.

As described above, the second component 212 may further comprise a connection ring 224. The connection ring 224 may comprise a dissimilar material or a secondarily processed material that prevents galling of the threads 204 when the first component 206 is rotated with respect to the second component 212 to engage threads 204 and 210. One example such as Beryllium Copper (BeCu). Other examples would be appreciated by one of ordinary skill in the art in view of this disclosure. In certain embodiments, the connection ring 224 may also facilitate a press fit between the box 208 and pin 202. For example, the connection ring 224 may comprise a slight taper (e.g., on the order of a few degrees) that engages with the taper 222 on the outer surface of the first component 206. Notably, the taper 222 of the first component 206 and the taper of the connection ring 224 can but are not required to match.

The press fit facilitated by the connection ring 224 may comprise one portion of an interference fit between the first component 206 and the second component 212 when the first component 206 is fully installed and threaded within the second component 212. In addition to the interference fit, the connection 200 may comprise a "loaded" or "made up" connection between the threads 204 with the threads 210, and the end 250 of the first component 206 with the shoulder 252 of the second component 212. The combined frictional, axial, and radial forces acting on the first and second components 206 and 212 and their corresponding parts may provide the interference fit and loaded connection that may improve the bending and torque load limit of the threaded connection 200. Specifically, when the first component 206 is fully installed and threaded within the second component 212, the first and second components 206 and 212 may behave as a single unit with a large section modulus, significantly reducing stress at the threads 204 and relief 228 of the pin 202 that would otherwise be caused by a bending load and weaken the threaded connection 200.

The threads 204 and 210 may be "loaded" when the first component 206 is fully installed and threaded within the second component 212, as is shown in FIG. 2. Specifically, the threads 204 may impart forces on the threads 210 when the first component 206 and second component 212 are threaded together. Similarly, the threads 210 may impose equal and opposite forces on the threads 204. The forces on the threads 204 and 210 may be equal in magnitude with the axial forces 254 and 256 at the end 250 and shoulder 252. In a typical threaded connection, however, the thread loads may be inconsistent across the length of the threads 204 and 210, with the first few threads 204 and 210 proximate to the shoulder 252 bearing most of the load. This can reduce the strength of the threaded connection 200 and increase the chances of galling or fracture on the first loaded threads.

According to aspects of the present disclosure, at least one of the threads 204 and 210 may comprise at least one of a variable pitch and a variable taper, both of which will be described in detail below. Varying the pitch or taper on the threads may balance the thread load equally across each of the threads in the pin 202 and box 208, which may increase the strength of the threaded connection while allowing for the length of the threads 204 and 210 to be shortened. Additionally, balancing the thread loads across the length of threads 204 and 210 provides a loaded axial thread area that is balanced with the axial loaded area at the end 250 which may provide higher torque capacity.

Figure 3:
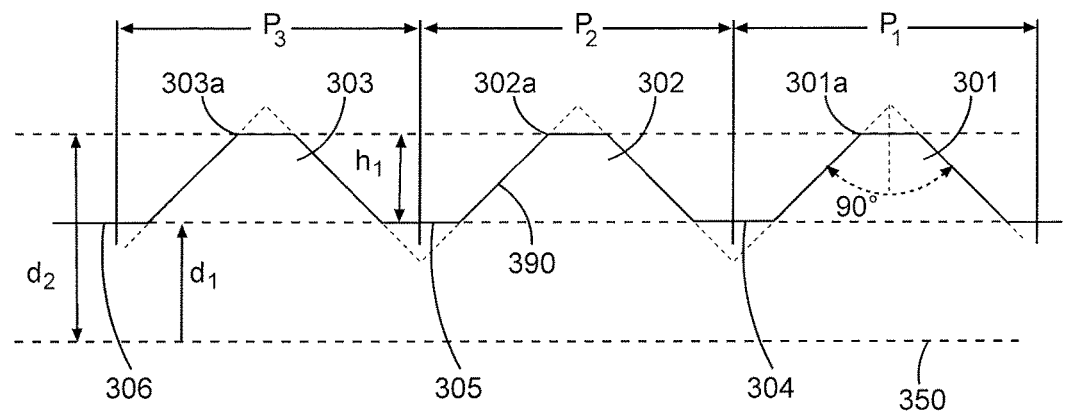
FIG. 3 is a diagram of an example threaded portion with variable pitch, according to aspects of the present disclosure.

FIG. 3 is a diagram illustrating a threaded portion with a variable pitch, according to aspects of the present disclosure. The threaded portion comprises three threads 301-303 positioned on an outer surface of a cylindrical component with a longitudinal axis 350. The threads 301-303 may comprise crests 301a-303c and roots 304-306, and each may have a 90 degree included thread angle, but other thread angles are possible, including large included thread angles of between approximately 60 degrees and approximately 90 degrees. The 90 degree included thread angle may increase the radial thread load, for a given axial thread load, which may increase the torque capacity. The crests 301a-303c may be positioned at the same distance $d_2$ from the axis 350, referred to as the major diameter of the threads 301-303. Similarly, the roots 304-306, may be positioned at the same distance $d_1$ from the axis 350, referred to as the minor diameter of the threads 301-303. The height h of a thread may be determined by subtracting the major diameter from the minor diameter. In the embodiment shown, the heights of the threads are constant because the threads 301-303 share the same major and minor diameters. The same exposed side of each of the threads 301-303, e.g. surface 390 of thread 302 and similar surfaces on threads 301 and 303, may provide a thread contact area with a corresponding thread when the threaded connection is made up.

The pitch of a thread may be characterized by the distance between a first point on the thread to a corresponding point on the next thread measured parallel to the axis 350. In the embodiment shown, the threads 301-303 comprise corresponding pitches $P_1$-$P_3$, measured at the midpoints of each root 304-306 between adjacent threads 301-303. According to aspects of the present disclosure at least two of the pitches $P_1$-$P_3$ may be different. In the embodiment shown, each of the pitches $P_1$-$P_3$ are different, with $P_3$ being the largest and $P_1$ the smallest. In certain embodiments, the largest pitch $P_3$ may be positioned closest to an end of the threads closest to a contact shoulder. The pitches $P_1$-$P_3$ may be set or varied, for example, by setting or varying the distances of the crests 301a-303a, the roots 304-306, or some combination of the two in the direction of the axis 350. In FIG. 3, the pitches $P_1$-$P_3$ are set at different distances because the lengths of the roots 304-306 and non-uniform. Notably, the lengths of the roots 304-306 and the crests 301a-303a may be varied without altering either the major diameter $d_2$ or the minor diameter $d_1$, meaning the height h of the threads 301-303 may remain constant across the threads 301-303. Additionally, the pitches $P_1$-$P_3$ may be varied without altering the thread angles of the threads 301-303.

In certain embodiments, the variable pitches may comprise pitches that are set independently, or that are set according to a formula or algorithm. For example, in the embodiment shown, the pitches $P_1$-$P_3$ increase from thread 301 to thread 303 in a substantially linear way, with the increase between each successive pitch being larger by a fixed distance or percentage. In other embodiments, the pitches $P_1$-$P_3$ may be varied according to a non-linear formula, such as an exponential formula. Additionally, the pitches $P_1$-$P_3$ may be set independently, such that the thread profile comprise a substantially random collection of pitches. In certain embodiments, it may be necessary to limit the amount of acceptable difference between adjacent pitches, to prevent damage to the threads. Although FIG. 3 illustrates a male external thread, the same principles of varying the pitch can be applied to a female internal thread. The male and/or female threads can be configured with variable pitch threads to affect balanced thread loading.

Figure 4:
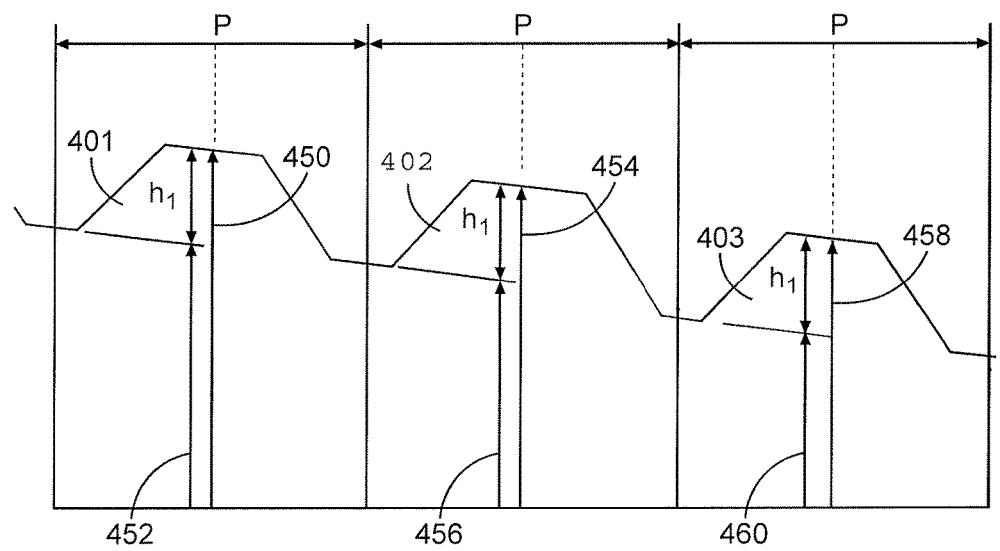
FIG. 4 is a diagram of an example threaded portion with variable taper, according to aspects of the present disclosure.

FIG. 4 is a diagram illustrating a threaded portion 401-403 with a uniform pitch P and a variable taper, according to aspects of the present disclosure. A variable taper may comprise a threaded portion in which at least one of the major and minor diameter is non-uniform across the length of the threads. In FIG. 4, thread 401 comprises a first major diameter 450 and a first minor diameter 452, thread 402 comprises a second major diameter 454 and a second minor diameter 456, and thread 403 comprises a third major diameter 458 and a third minor diameter 460. In the embodiment shown, the threads 401 and 402 comprise a first taper in which both the major diameters 450 and 454 and respective minor diameters 452 and 456 change in a uniform manner. Specifically the major diameters 450 and 454 and respective minor diameters 452 and 456 differ by the same amount, such that threads 401 and 402 comprise the same height $h_1$. In the embodiment shown, the threads 402 and 403 comprise a second taper in which both the major diameters 454 and 458 and respective minor diameters 456 and 460 change in a uniform manner. Specifically the major diameters 454 and 458 and respective minor diameters 456 and 460 differ by the same amount, such that threads 402 and 403 comprise the same height $h_1$. When comparing the first and second taper, however, the change in major diameters between thread threads 401 and 402 is less than the change in major diameters between threads 402 and 403. Similarly, the change in minor diameters between threads 401 and 402 is less than the change in minor diameters between threads 402 and 403. Therefore, the thread taper is less between threads 401 and 402 as compared to the thread taper between threads 402 and 403. (i.e. the thread taper varies between the first taper (threads 401 and 402) and the second taper (threads 402 and 403).

A variable taper may also comprise threads where the difference between the major diameters 450, 454, and 458 and the difference between the respective minor diameters 452, 456, 460 are non-uniform, including when thread height varies from thread to thread. Like the variable pitch described above, threads with a variable taper may comprise threads with major and/or minor diameters that vary linearly, according to a non-linear equations or algorithms, or independently. Additionally, in certain embodiments, threaded connections according to aspects of the present disclosure may comprise threads with both variable pitch and variable taper, with the pitch and taper of the threaded portion kept within certain tolerances to prevent damage to the threads. Although FIG. 4 illustrates a male external thread, the same principles of varying the taper can be applied to a female internal thread. The male and/or female threads can be configured with variable taper threads to affect balanced thread loading. Additionally, the threads 401-403 may each may have a 90 degree included thread angle, but other thread angles are possible, including large included thread angles of between approximately 60 degrees and approximately 90 degrees. The 90 degree included thread angle may increase the radial thread load, for a given axial thread load, which may increase the torque capacity.

According to aspects of the present disclosure, the pitch and/or taper of a threaded portion may be based, at least in part, on a mathematical model of a threaded connection. As described above, when a threaded connection is made, axial forces may be imparted on the components of the threaded connections. For downhole environments, high torque may be imparted onto the threaded connection to ensure that it stays together under downhole conditions. This high torque and the resulting axial forces on the components of the connection may elastically deform the components and the threads of the components. This deformation may, for example, alter the pitch or taper of the threads, changing how the radial and axial loads are distributed across the threads.

In certain embodiments, the components of a threaded connection, including the first and second components and corresponding threads, may be modeled in an information handling system. The model of the first and second components may comprise the dimensions and composition of the first and second components and the orientation of the threads on the first and second components. The model of the threads may comprise the length of the threads, the major and minor diameters of the threads, the thread angle, the thread pitch, etc. The information handling system may further model the threaded connections, including the forces applied on each of the components of the connection and the deformation caused by the formation. The model may be generated using one or more engineering software packages that would be appreciated by one of ordinary skill in the art in view of this disclosure.

In certain embodiments, a designer could alter the pitch and/or taper of the threads to account for the elastic deformation in both the first and second components. In another embodiment, the information handling system could automatically solve for the optimal thread pitch and taper to provide even thread loading across the length of the thread. This may be accomplish, for example, using an iterative process where the information receives as an input the thread dimensions and the effects of the elastic deformation on the first and second component and the threads, alters at least one of the thread dimensions, and then models the threaded connection with the updated thread dimensions. The information handling system may track the thread loading throughout each iteration until the threads are loaded evenly, or within a given threshold. The variable pitch and/or taper determined by the information handling system at the final iteration may then be selected as a dimension of the threads.

Figure 5:
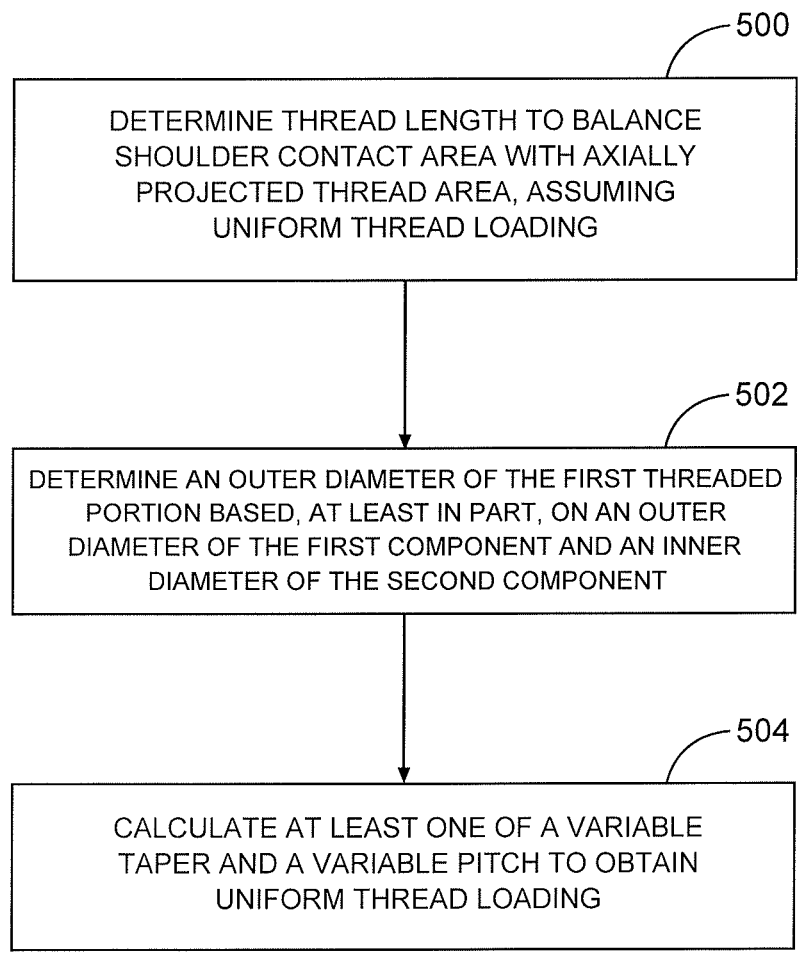
FIG. 5 is a diagram of an example process, according to aspects of the present disclosure.

According to aspects of the present disclosure, the thread and connection modeling described above may be incorporated into a larger process whereby a high torque and bending load threaded connection is designed. FIG. 5 is a diagram of an example process, according to aspects of the present disclosure. At step 500, the process comprises determining a thread length of a threaded connection that balance the internal shoulder contact area of the connection with an axially-projected thread contact area. As described above, the first component of a threaded connection may contact the second area at an internal shoulder. To balance the threaded connection, the surface area in contact between the end of the first component and the internal shoulder of the second component must be equal to the surface area in contact between the threads of the box and pin. Notably, because the threads may be angled with respect to the axial loads, only the axially-projected thread contact area, or the area of the threads which bear a portion of the axial load, is accounted for. The thread load across the threads is assumed to be uniform based on the variable pitch and/or taper of the threads described above.

At step 502, the maximum outer diameter of the pin threads as well as the size of the pin may be determined. The maximum outer diameter of the pin threads may depend, in part, on the inner diameter of a connection ring on the box portion of the threaded connection. Specifically, the maximum outer diameter of the pin threads must clear the inner diameter of the connection ring to prevent damage to the pin threads when the pin is inserted into the box. In certain embodiments, the connection ring parameters may be selected from a set of known parameters, and the outer diameter of the pin thread may be maximized so as to maximize the contact area between the end of the first component and the shoulder of the second component, as described above.

Step 504 may comprise calculating at least one of a variable taper and a variable pitch for the threads of the threaded connection. As described above, the variable taper and/or variable pitch of the threads may be selected to evenly balance the axial forces between the end of the first component and the shoulder of the second component across the length of the threads. In certain embodiments, the axial loads from the connection ring taper reduce a portion of the axial forces at the shoulder, and the thread pitch and/or taper are designed to balance the remaining axial force. When the actual thread loading is not completely uniform, the length of the pin threads may be adjusted and the process may repeated iteratively to ensure the maximum thread contact stress is within acceptable limits.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the component that it introduces.

What is claimed is:

1. A threaded connection, comprising:
    a first component of the threaded connection comprising
        a first outer diameter;
        a first threaded portion at the first outer diameter following a first taper and proximate to an end of the first component; and
        an end portion adjacent to the first threaded portion;
        a first thread relief between the first threaded portion and the first taper;
    a second component of the threaded connection comprising:
        a second outer diameter greater than the first outer diameter;
        a second threaded portion configured to threadedly engage the first threaded portion, wherein at least one of the first or second threaded portions comprises at least one of a variable pitch and a variable taper;
        an internal shoulder positioned to contact the end portion of the first component when the first threaded portion is engaged with the second threaded portion; and
    a connection ring coupled to the second component and positioned to engage with the first component when the first component is positioned within the second component, wherein the connection ring provides an interference fit between the first component and the second component when the first component is threaded within the second component.

2. The threaded connection of claim 1, further comprising a second thread relief between the second threaded portion and the internal shoulder.

3. The threaded connection of claim 1, wherein the first threaded portion and the second threaded portion comprise an included thread angle of between approximately 60 degrees and approximately 90 degrees.

4. The threaded connection of claim 1, wherein
    the first component further comprises an inner diameter defined by a bore through the first component; and
    a section modulus of the threaded connection when the first threaded portion is engaged with the second threaded portion comprises the inner diameter of the first component and the second outer diameter of the second component.

5. The threaded connection of claim 4, wherein the variable pitch and/or variable taper changes one of linearly and non-linearly across the length of the corresponding first and/or threaded portions.

6. The threaded connection of claim 1, wherein the variable pitch and/or variable taper is calculated using an information handling system to produce a uniform thread load across the first and second threaded portions, or a thread load that is near-uniform within a tolerance.

7. The threaded connection of claim 6, wherein the variable pitch and/or variable taper is calculated based, at least in part, on a modeled deformation of at least one of the first component and the second component.

8. The threaded connection of claim 1, wherein the second component comprises a bit sub and the first component comprises a drive shaft coupling the bit sub to a downhole steering assembly.

9. The threaded connection of claim 1, wherein at least one of the connection ring, the first threaded portion, and the second threaded portion comprise a material or coating that prevents galling.

* * * * *